July 18, 1944.  C. F. OSGOOD  2,353,967
VALVE MECHANISM
Filed Aug. 1, 1942  3 Sheets—Sheet 1
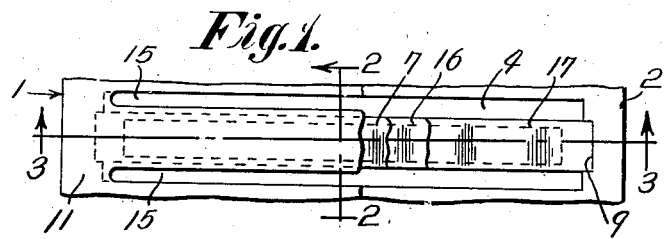
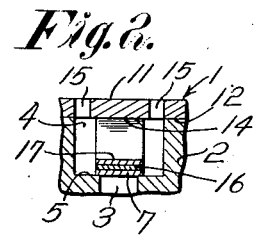
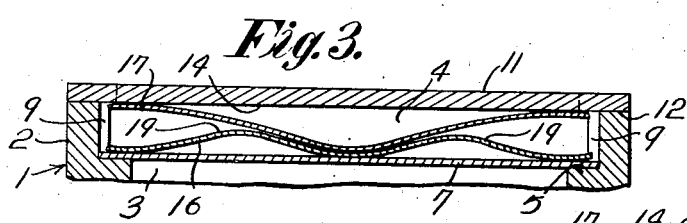
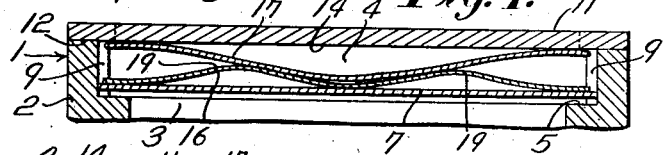
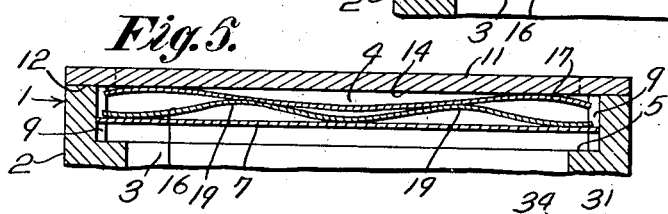
Inventor:
Charles F. Osgood.
by
Louis A. Maxson
Atty.

July 18, 1944.　　C. F. OSGOOD　　2,353,967
VALVE MECHANISM
Filed Aug. 1, 1942　　3 Sheets-Sheet 2
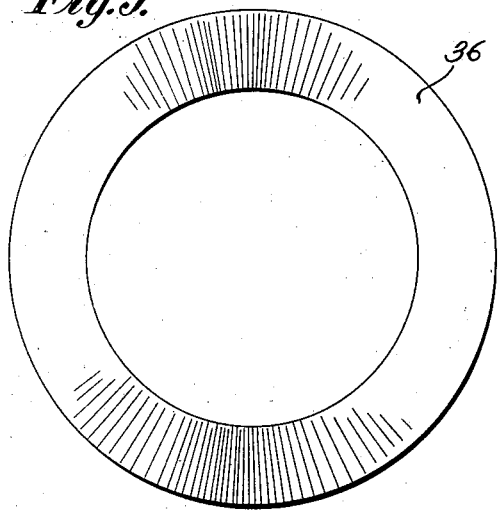
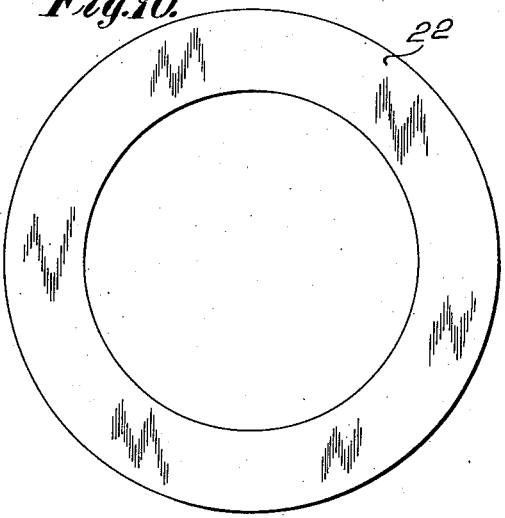
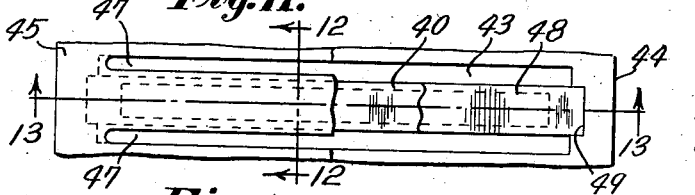
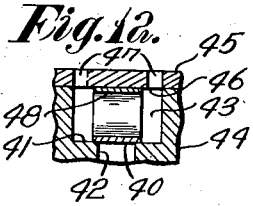
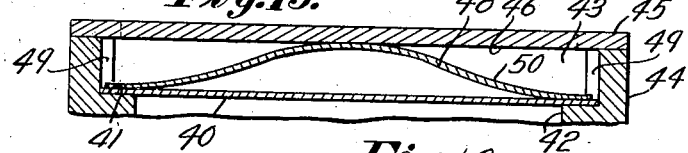
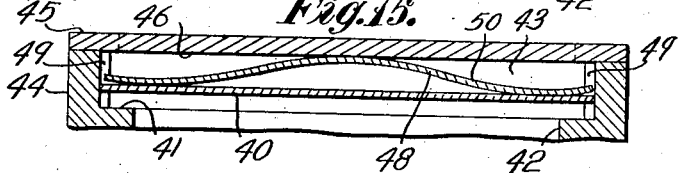
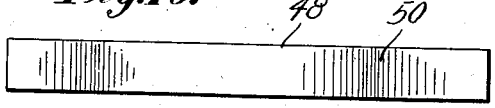
Inventor:
Charles F. Osgood.
by
Atty.

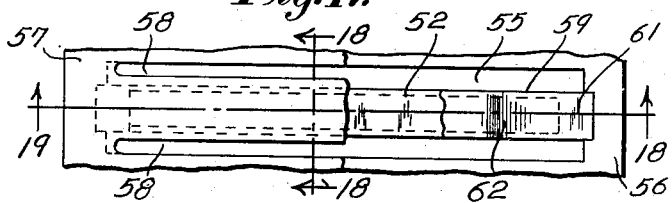
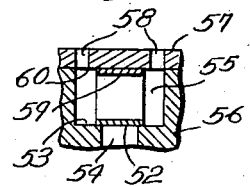
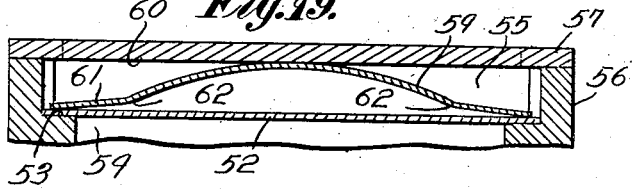
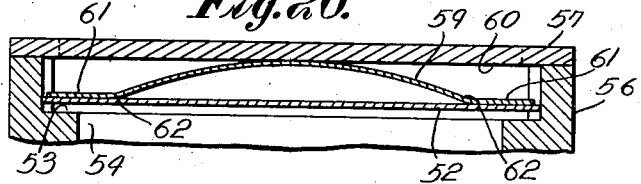
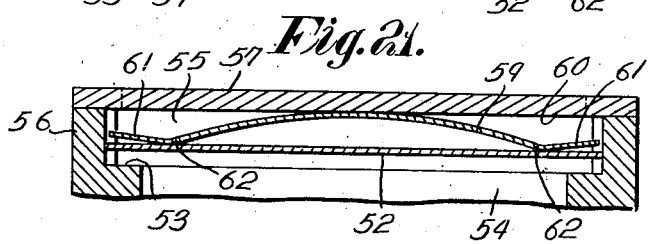
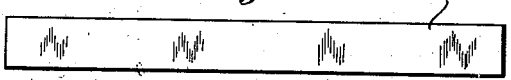

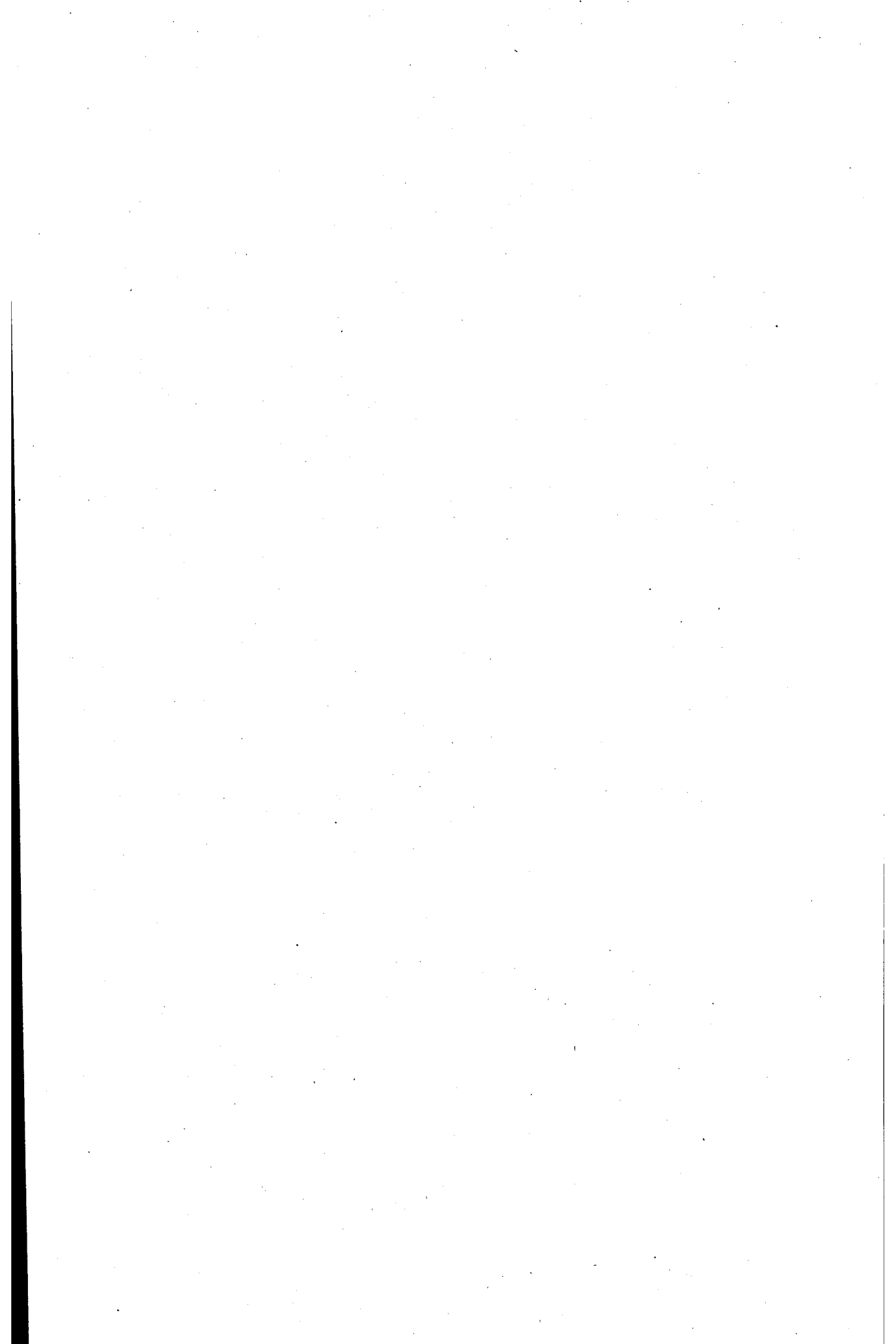

Patented July 18, 1944

2,353,967

UNITED STATES PATENT OFFICE 2,353,967

VALVE MECHANISM

Charles F. Osgood, Claremont, N. H., assignor to Sullivan Machinery Company, a corporation of Massachusetts Application August 1, 1942, Serial No. 453,218

11 Claims. (Cl. 251—119)

This invention relates to valve mechanisms, and more particularly to valve mechanisms for pumps and compressors.

Valve mechanisms, especially those adapted for use in gaseous fluid pumps and compressors, should be designed to open at minimum pressure differentials and yet be adequately cushioned to prevent breakage of the valves. In the ordinary valve mechanism employing a bowed ribbon-type spring or a transversely flexed annular type spring between a guard and a valve member, the unsupported length of the spring remains practically the same throughout the full movement of the valve. If the lengths of the unsupported portions of the spring can be shortened as the valve opens, it will be evident that the resistance to opening movement will be increased and the valve will be better cushioned. The desired shortening of the unsupported spring portions may be obtained by providing a waved surface which is engageable by the spring at points moving along the latter as the valve moves relative to its seat. Similar results may be obtained by shaping the valve spring in such a way that different points on the spring present themselves for engagement with plane surfaces on other parts of the valve mechanism as the spring is deflected. By establishing minimum instantaneous contact areas at the places where the spring has a sliding contact with other parts of the mechanism, and by causing these contacts to be distributed over large portions of the parts, a reduced wear of the parts may be obtained.

An object of this invention is to provide an improved valve mechanism. Another object is to provide an improved valve mechanism operating on pressure differentials for controlling the flow of fluid relative to a pump or compressor. Still another object is to provide an improved valve mechanism having improved means for increasing the resistance to valve opening movements as the valve moves away from its seat. Yet another object is to provide an improved valve mechanism having a waved spring adapted to cooperate with other parts of the mechanism in an improved manner to effect a shortening of the spring arms as the valve is moved away from its seat. Still another object is to provide an improved valve mechanism having improved means for cushioning the valve and reducing the wear of parts at sliding contacts. Still another object is to provide an improved valve spring for urging the valve toward its closed position, and so arranged and constructed that its effective length is substantially decreased during opening of the valve thereby to offer substantially increased resistance to valve movement. A further object is to provide improved means engaging the spring at the side of the latter toward the valve for modifying the action of the spring as the valve moves toward open position. Yet another object is to provide a novel means associated with the spring for modifying the spring flexure as the valve moves toward open position thereby to offer increased resistance to valve movement. Other objects of the invention will hereinafter more fully appear.

In the accompanying drawings, in which several illustrative embodiments of the invention have been shown:

Fig. 1 is a fragmentary plan view, with parts broken away, showing one embodiment of the invention incorporated in a strip or ribbon-type valve mechanism.

Fig. 2 is a cross sectional view taken on the plane of the line 2—2 of Fig. 1.

Fig. 3 is a vertical longitudinal sectional view of the valve mechanism taken on the plane of the line 3—3 of Fig. 1.

Fig. 4 is a view similar to Fig. 3 but showing the valve moved a short distance from its seat.

Fig. 5 is a view similar to Fig. 4 but showing the valve in a further-opened position.

Fig. 6 is a fragmentary central sectional view with parts broken away showing an embodiment of the invention incorporated in an annular-type valve mechanism.

Fig. 7 is a view similar to Fig. 6 but with parts omitted showing the valve in an open position.

Fig. 8 is a plan view of the spring-action-modifying plate which is shown in Figs. 6 and 7.

Figs. 9 and 10 are plan views, respectively, of the spring and valve elements which are shown in Figs. 6 and 7.

Fig. 11 is a fragmentary plan view, with parts broken away, showing another embodiment of the invention incorporated in a strip or ribbon-type valve mechanism.

Fig. 12 is a cross sectional view taken on the plane of the line 12—12 of Fig. 11.

Fig. 13 is a vertical longitudinal sectional view taken on the plane of the line 13—13 of Fig. 11.

Figs. 14 and 15 are views similar to Fig. 13 but show the valve in different unseated positions.

Fig. 16 is a plan view of the valve spring shown in Figs. 11 to 15.

Fig. 17 is a fragmentary plan view, with parts broken away, showing still another embodiment of the invention incorporated in a strip or ribbon-type valve mechanism.

Fig. 18 is a cross sectional view taken on the plane of the line 18—18 of Fig. 17.

Fig. 19 is a vertical longitudinal sectional view taken on the plane of the line 19—19 of Fig. 17.

Figs. 20 and 21 are views similar to Fig. 19 but show the valve in different open positions.

Figs. 22 and 23 are plan views, respectively, of the spring and valve elements shown in Figs. 17 to 21.

One embodiment of my invention is shown in Figs. 1 to 5, inclusive, incorporated in a strip or ribbon-type valve mechanism generally designated 1. This valve mechanism comprises a seat or cage element 2 having an elongated port 3 therein communicating with a recess 4, which opens through the upper surface of the seat or cage element. The dimensions of the recess 4 perpendicular to the axis of the port are substantially greater than corresponding dimensions of the port, and the recess is so formed that there is provided around the port a valve seat surface 5 with which a plane ribbon or strip-type valve element 7 cooperates.

The valve element 7 is desirably made relatively inflexible, and is so constructed and guided for movement relative to the valve seat surface that there is provided adequate space, when the valve is moved from its seat, for fluid to flow from the port 3 past the valve into the recess 4. In the mechanism shown the valve is of less width than the recess 4, but is sufficiently wide to cover and seal the port 3 when seated, and the valve is centered within the recess so that clearances are provided between the sides of the valve and the walls of the recess, through which fluid may flow when the valve is opened. In order to insure a covering of the port by the valve and a positioning of the valve to give uniform operation of the mechanism, there are provided means for guiding the valve so that it is parallel to the length of the port. The guiding means shown comprises vertically extending grooves 9 formed in the end walls of the recess and receiving the ends of the valve.

Fixed in any suitable manner to the top of the cage element 2 is a rigid guard element 11 having a surface 12 sealingly engaging the top surface of the cage element, and also having a plane surface 14 facing the valve seat. Formed in the guard element are laterally spaced discharge passages 15 opening into the recess 4 for conducting fluid away from the latter.

Arranged within the recess 4 is a waved spring-action-modifying plate 16 resting upon the valve element 7, and a transversely bowed spring element 17 acting between the reaction plate and the guard element 11. The spring-action-modifying plate and the spring are shown as being of the same width as the valve, and their ends extend into the grooves 9 so that they are held in positions above the valve at all times. The spring-action-modifying plate is relatively rigid and is herein provided with two waves 19 having their peaks spaced equal distances from the ends of the plate. The portions of the spring-action-modifying plate adjacent its outer ends and at its center between the peaks of the waves engage the valve element 7. The bowed spring 17 engages the spring-action-modifying plate substantially only with line contact at points in the trough midway between the peaks of the waves 19 when the valve is closed, and engages the surface 14 of the guard element substantially in line contact at points near the ends of the recess 4. The portions of the spring between the points of contact with the spring-action-modifying plate and the guard element are so curved that, on deflecting the spring by opening the valve, the points of contact between the spring and guard move inwardly along the spring and the guard surface 14, and the inner portion of the spring moves into engagement with the inclined surfaces of the spring-action-modifying plate. The shortening of the unsupported portions of the spring by the change in the points of contact of the spring with the guard member 11 and the spring-action-modifying plate 16 results in a rapidly increasing resistance to opening movements of the valve. Due to the curvature of the end portions of the spring, there is obtained a combined sliding and rolling contact between the guard member and the spring as the latter is deflected. By this action, the amount of contact between the spring and the guard member is maintained substantially constant, and the contact is distributed over a larger area of the members. This results in less sliding resistance, a greater distribution of wear on the parts, and an increased shortening of the unsupported portions of the spring for cushioning the opening of the valve.

In Figs. 6 to 10, inclusive, there is shown a modification in which an annular valve element 22 coacts with concentric annular seat surfaces 23 and 24 surrounding annularly arranged flow passages 25 which open into a circular recess 26 formed in a valve seat or cage element 27. Arranged within the recess 26 is a guard member 28 having valve guiding portions 29 extending perpendicular to the seat surfaces 23 and 24, and having an inner plate portion 30 clamped to the cage element 27, as by a bolt 31. The outer periphery of the guard member is spaced from the walls of the recess 26 to provide an annular passage 33 through which fluid may pass from the recess 26 to suitable flow passages, not shown, in the upper portion of the cage element 27. Between the guide portions 29 of the guard member are openings 34 through which fluid may pass to the central portion of the recess 26 and to the upper flow passages. Resting upon the valve 22 is a rigid circumferentially waved annular spring-action-modifying plate 35, and arranged between the spring-action-modifying plate and the guard member 28 is a circumferentially waved annular spring 36. The number of waves in the spring-action-modifying plate is twice that of the spring, and the spring is positioned on the spring-action-modifying plate so that the low points of its waves engage the bottom of every other trough on the spring-action-modifying plate with line contact when the valve is closed. The peaks of the waves on the spring engage the guard member 28 at points above the troughs on the spring-action-modifying plate not contacted by the spring. As the valve element 22 is moved from its seat, the spring 36 is deflected, and the points of contact between the spring and the spring-action-modifying plate are caused to travel in opposite directions from their original lines of contact and effect a shortening of the unsupported portions of the spring.

Figs. 11 to 16, inclusive, show a modification of the invention in which a plane strip-type valve element 40 cooperates with a valve seat 41 for controlling the flow of fluid from an elongated port 42 to a recess 43 in a valve cage member 44. Secured in any suitable manner to the top of the cage member is a guard element 45 presenting a plane surface 46 to the recess 43 and